United States Patent Office 3,751,450
Patented Aug. 7, 1973

3,751,450
SUBSTITUTED PHENYLCARBAMATES
Adolf Fischer, Mutterstadt, Albrecht Mueller, Frankenthal, and Guenter Hansen, Ludwigshafen, Germany, assignors to Badische Anilin- & Soda-Fabrik Aktiengesellschaft, Ludwigshafen (Rhine), Germany
No Drawing. Filed May 25, 1971, Ser. No. 146,791
Int. Cl. C07c 125/06
U.S. Cl. 260—479 C                              1 Claim

ABSTRACT OF THE DISCLOSURE

New and valuable substituted phenylcarbamates having a good herbicidal action and a process for controlling the growth of unwanted plants with these compounds.

---

The present invention relates to substituted phenylcarbamates having a good herbicidal action.

It is known to use isopropyl m-chlorophenylcarbamate as a herbicide. However, its compatibility with crop plants and its action on broadleaved and grassy weeds is unsatisfactory.

We have now found that carbamates of the formula

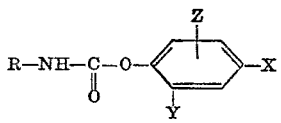

where R denotes alkyl (methyl, ethyl) which may be substituted by halogen (chlorine, bromine), Z denotes hydrogen or methyl, X denotes hydrogen or the radical

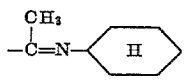

and Y denotes hydrogen or the radical

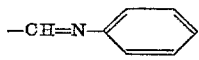

X and Y not simultaneously denoting hydrogen, have a good herbicidal action.

This action is particularly in evidence when the active ingredients are used postemergence at low application rates (up to 1.5 kg. per hectare) for controlling *Sinapis arvensis, Chenopodium album, Poa annua, Lolium perenne, Alopecurus myosuroides* and *Poa trivialis* in crop plants such as *Beta vulgaris, Hordeum vulgare, Zea mays* and *Triticum aestivum*.

The new compounds may be prepared by reacting the appropriate phenols (Ber., 46, 2718, Chem. Rev., 63, 489, 1963) in the presence or absence of a solvent with an isocyanate in accordance with known methods in the presence of a catalyst such as triethylamine or dibutyl tin diacetate, or by reacting the alkali metal salts of the appropriate phenols with the appropriate carbamyl chlorides, or by reacting the free phenols in the presence of an inorganic (NaOH, K₂CO₃, etc.) or organic (triethylamine, pyridine, quinoline, dialkylcyclohexylamine) base.

The preparation of the compounds is illustrated below.

EXAMPLE 1

Preparation of salicylaldehyde anil N-methylcarbamate 11 parts (by weight) of salicylaldehyde anil [1] is dissolved in 50 parts of dry acetone; 0.1 part of triethylamine is added. At 20° C. a solution of 3.74 parts (10% excess) of methyl isocyanate in 10 parts of dry acetone is allowed to flow slowly in, and the reaction mixture is subsequently stirred for 8 hours at room temperature.

[1] Ber., 46, 2718; Du Parc, Ann. Chem., 266, 140; Anselmino, Ber., 40, 3474.

The reaction solution is concentrated, a yellow oil being obtained. The oil is dissolved in methylene chloride and clarified with activated carbon. After the methylene chloride has been distilled off colorless crystals are obtained having the formula

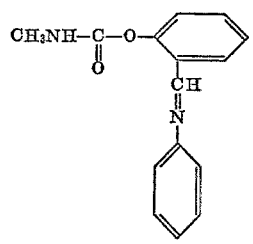

Yield: 9.5 parts.

*Analysis.*—Calculated for $C_{15}H_{14}O_2N_2$ (254.27). Calc. (percent): C, 70.85; H, 5.55; N, 11.02. Found (percent): C, 71.1; H, 5.7; N, 10.9.

Melting point: 100° to 101° C.

EXAMPLE 2

Preparation of p-hydroxyacetophenonecyclohexylimine N-methylcarbamate

At 30° C., 24.8 parts of cyclohexylamine in 20 ml. of ethanol is added to 34 parts of p-hydroxyacetophenone in 80 ml. of ethanol. As catalyst, a small amount of HCl or 1 part of ZnCl₂ is added. Heat of reaction is evolved. The mixture is stirred for 2 hours under reflux. After cooling, concentration is effected, 59.2 parts of an oil being obtained. After recrystallization from benzene/cyclohexane colorless crystals of p-hydroxyacetophenonecyclohexylimine melting at 97° to 100° C. are obtained.

15.2 parts of p-hydroxyacetophenonecyclohexylimine is dissolved in 70 parts of absolute tetrahydrofuran; 0.1 part of triethylamine is added. At room temperature a solution of 4.4 parts of methyl isocyanate in 15 parts of absolute tetrahydrofuran is slowly introduced. The mixture heats up and passes completely into solution. After about 1 hour, a white crystalline precipitate is formed. Melting point: 114° to 119° C. Yield: 12.8 parts.

The following compounds may be prepared analogously:

salicylaldehyde anil N-dimethylcarbamate;
p-hydroxyacetophenonecyclohexylimine N-dimethylcarbamate;
o-methyl-p-hydroxyacetophenonecyclohexylimine N-dimethylcarbamate;
6-methylsalicylaldehyde anil N-dimethylcarbamate;
o-methyl-6-hydroxyacetophenonecyclohexylimine N-methylcarbamate;
6-methylsalicylaldehyde anil N-methylcarbamate;
m-methyl-p-hydroxyaetophenonecyclohexylimine N-dimethylcarbamate;
m-methyl-p-hydroxyacetophenonecyclohexylimine N-methylcarbamate;
3-(5)-methylsalicylaldehyde anil N-dimethylcarbamate;
3-(5)-methylsalicylaldehyde anil N-methylcarbamate.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such as dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following example demonstrates the application and use of the new active ingredients.

EXAMPLE 3

The plants *Beta vulgaris, Zea mays, Triticum aestivum, Sinapis arvensis, Chenopodium album, Poa annua* and *Poa trivialis* were treated at a growth height of 2 to 17 cm. with 1.5 kg. per hectare of each of the following active ingredients (I) salicylaldehyde anil N-methylcarbamate,
(II) p-hydroxyacetophenonecyclohexylimine N-methylcarbamate
(III) isopropyl m-chlorophenylcarbamate (comparative agent), each active ingredient being dispersed in 500 liters of water per hectare.

After 3 to 4 weeks it was ascertained that active ingredients I and II had a compatibility with crop plants superior to that of III, combined with a stronger action on the broadleaved and grassy weeds.

The results of the experiment are given in the following table:

|  | Active ingredient | | |
| --- | --- | --- | --- |
|  | I | II | III |
| Crop plants: | | | |
| Beta vulgaris | 10 | 0 | 10 |
| Zea mays | 10 | 0 | 20 |
| Triticym aestivum | 10 | 0 | 30 |
| Unwanted plants: | | | |
| Sinapis arvensis | 90 | 90 | 60 |
| Chenopodium album | 90 | 90 | 60 |
| Poa annua | 95 | 70 | 45 |
| Poa trivialis | 95 | 70 | 40 |

NOTE.—0=No damage; 100=Complete destruction.

EXAMPLE 4

90 parts by weight of the compound of Example 1 is mixed with 10 parts by weight of N-methyl-α-pyrrolidone. A mixture is obtained which is suitable for application in the form of very fine drops.

EXAMPLE 5

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of the compound of Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of the compound of Example 1 is well mixed with 3 parts by weight of the sodium salt of diisobutylnaphthalene-α-sulfonic acid, 17 parts by weight of the sodium salt of a lignin-sulfonic acid obtained from a sulfite waste liquor, and 60 parts by weight of powdered silica gel, and triturated in a hammer mill. By uniformly distributing the fixture in 20,000 parts by weight of water, a spray liquid is obtained containing 0.1% by weight of the active ingredient.

EXAMPLE 9

3 parts by weight of the compound of Example 2 is intimately mixed with 97 parts by weight of particulate kaolin. A dust is obtained containing 3% by weight of the active ingredient.

EXAMPLE 10

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. p-Hydroxyacetophenonecyclohexylimine N-methylcarbamate.

References Cited
UNITED STATES PATENTS 3,012,068   12/1961   Shulgin _____ 260—479

JAMES A. PATTEN, Primary Examiner

U.S. Cl. X.R.

71—106; 260—566 F

UNITED STATES PATENT OFFICE
CERTIFICATE OF CORRECTION

Patent No. 3,751,450    Dated August 7, 1973

Inventor(s) Adolf Fischer, Albrecht Mueller, and Guenter Hansen

It is certified that error appears in the above-identified patent and that said Letters Patent are hereby corrected as shown below:

Column 1, line 8, insert -- Claims priority, application Germany, June 9, 1970, P 20 28 170.3 --.

Column 2, line 51, "o-methyl-6-hydroxyacetophenonenyclohexyl-imine" should read -- o-methyl-p-hydroxyacetophenonecyclohexylimine --.

Column 2, line 54, "m-methyl-p-hydroxyaetophenonecyclohexylimine" should read -- m-methyl-p-hydroxyacetophenonecyclohexylimine --.

Column 3, line 43, "Triticym" should read -- Triticum --.

Signed and sealed this 27th day of November 1973.

(SEAL)
Attest:

EDWARD M. FLETCHER, JR.
Attesting Officer

RENE D. TEGTMEYER
Acting Commissioner of Patents